United States Patent
Liu et al.

(10) Patent No.: US 12,511,027 B2
(45) Date of Patent: Dec. 30, 2025

(54) EFFECT PROCESSING METHOD, APPARATUS, ELECTRONIC DEVICE, AND STORAGE MEDIUM

(71) Applicant: Beijing Zitiao Network Technology Co., Ltd., Beijing (CN)

(72) Inventors: Gao Liu, Beijing (CN); Ziyue Wang, Beijing (CN); Yantong Wei, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/057,263

(22) Filed: Feb. 19, 2025

(65) Prior Publication Data

US 2025/0190100 A1  Jun. 12, 2025

Related U.S. Application Data

(63) Continuation of application No. PCT/CN2023/113239, filed on Aug. 16, 2023.

(30) Foreign Application Priority Data

Aug. 19, 2022 (CN) .......................... 202211003252.0

(51) Int. Cl.
G06F 3/04845 (2022.01)
G06F 3/0481 (2022.01)
G06F 3/04842 (2022.01)

(52) U.S. Cl.
CPC ........ *G06F 3/04845* (2013.01); *G06F 3/0481* (2013.01); *G06F 3/04842* (2013.01)

(58) Field of Classification Search
None
See application file for complete search history.

(56) References Cited

U.S. PATENT DOCUMENTS 10,217,253 B2 *  2/2019  DiVerdi ................ G06T 11/203
10,388,322 B1    8/2019  Pena et al.
(Continued)

FOREIGN PATENT DOCUMENTS

CN     106709762 A    5/2017
CN     111541914 A    8/2020
(Continued)

OTHER PUBLICATIONS

He, C. et al., "Design Strategy of Mobile Short Video Application Based on Hooked Theory," Packaging Engineering, vol. 42, No. 2, Jan. 2021, 6 pages. (Submitted with English abstract).

(Continued)

*Primary Examiner* — Tuyetlien T Tran
(74) *Attorney, Agent, or Firm* — Alleman Hall & Tuttle LLP (57) ABSTRACT

Embodiments of the disclosure provide an effect processing method, apparatus, electronic device, and storage medium. The method includes: displaying, responsive to an edit triggering operation with respect to a first effect, at least one effect-editing control corresponding to the first effect; receiving an effect editing operation applied to the at least one effect-editing control and displaying an edited applied result; and receiving an effect-generation triggering operation, generating a second effect corresponding to the applied result, and displaying an effect identifier of the second effect at a preset position.

18 Claims, 5 Drawing Sheets

(56) References Cited

U.S. PATENT DOCUMENTS

| | | | |
|---|---|---|---|
| 11,212,331 B1* | 12/2021 | Gaiduchenko | H04L 65/762 |
| 2005/0278691 A1 | 12/2005 | MacPhee | |
| 2010/0274714 A1* | 10/2010 | Sims | G11B 27/031 |
| | | | 705/40 |
| 2016/0085303 A1* | 3/2016 | Israr | H04N 21/485 |
| | | | 340/407.2 |
| 2019/0205929 A1* | 7/2019 | Snibbe | G06Q 30/0251 |
| 2020/0412976 A1* | 12/2020 | Hao | H04N 23/60 |
| 2021/0037193 A1* | 2/2021 | Lin | H04N 23/633 |
| 2022/0245885 A1* | 8/2022 | Pagés | G06T 7/564 |
| 2022/0394191 A1 | 12/2022 | Wang et al. | |
| 2023/0097879 A1* | 3/2023 | Long | G06F 3/04845 |
| | | | 348/222.1 |
| 2023/0352054 A1* | 11/2023 | Judi | G11B 27/34 |
| 2024/0054710 A1* | 2/2024 | Ma | G06T 13/20 |
| 2024/0223840 A1* | 7/2024 | Han | G11B 27/031 |

FOREIGN PATENT DOCUMENTS

| | | |
|---|---|---|
| CN | 112084750 A | 12/2020 |
| CN | 112135059 A | 12/2020 |
| CN | 112905291 A | 6/2021 |
| CN | 113709549 A | 11/2021 |
| CN | 113778285 A | 12/2021 |
| CN | 113919311 A | 1/2022 |
| CN | 113938618 A | 1/2022 |
| CN | 114241174 A | 3/2022 |
| CN | 114299270 A | 4/2022 |
| CN | 115379136 A | 11/2022 |
| JP | 2021089517 A | 6/2021 |

OTHER PUBLICATIONS

ISA China National Intellectual Property Administration, First Search Report Issued in Application No. 202211003252.0, Dec. 20, 2023, 2 pages.

ISA China National Intellectual Property Administration, International Search Report Issued in Application No. PCT/CN2023/113239, Oct. 23, 2023, 8 pages.

ISA China National Intellectual Property Administration, Second Supplementary Search Issued in Application No. 202211003252.0, Jul. 26, 2024, 1 page.

ISA China National Intellectual Property Administration, Supplementary Search Issued in Application No. 202211003252.0, Apr. 30, 2024, 2 pages.

Vasanth, G. et al., "VideoCutTool—Online Video Editor Tool for Wikimedia Commons," Proceedings of the 2020 International Conference on Communication and Signal Processing (ICCSP), Jul. 28, 2020, Chennai, India, 2 pages. (Submitted with English abstract).

European Patent Office, Extended European Search Report Issued in Application No. 23854457.1, Sep. 23, 2025, Germany, 12 pages.

Japan Patent Office, Office Action Issued in Application No. 2025510381, Nov. 25, 2025, 6 pages.

* cited by examiner

FIG. 7

EFFECT PROCESSING METHOD, APPARATUS, ELECTRONIC DEVICE, AND STORAGE MEDIUM

CROSS-REFERENCE TO RELATED APPLICATION(S)

This application is a Continuation application of International Patent Application No. PCT/CN2023/113239, filed Aug. 16, 2023, which claims priority to Chinese Patent Application No. 202211003252.0 filed Aug. 19, 2022, the disclosures of which are incorporated herein by reference in their entireties.

FIELD

Embodiments of the disclosure generally relate to technologies in effect making, and more particularly relate to an effect processing method, apparatus, electronic device, and storage medium.

BACKGROUND

Filming of short-form videos is now one of the most trending entertainments. Short-form videos are attractive to users due to their abundant, intuitive, and vivid contents. With constant advancement in short-form video technologies, users become increasingly demanding on richness and entertaining appeal of the short-form videos filmed. In some short-form videos, effects are leveraged to enrich their visual effects.

However, relevant techniques for generating effects always rely on development by specialized developers. In scenarios of use, users can only select system-provided, formalized effects to film short-form videos with effects rendered. Due to limitations of effects, the rendered effects are relatively monotonous, which cannot satisfy individualized demands of users, affecting use experience of the users.

SUMMARY

The disclosure provides an effect processing method, apparatus, electronic device, and a storage medium, so as to increase richness of the effects, and enhance user experience and entertainment.

In a first aspect, embodiments of the disclosure provide an effect processing method, comprising:
  displaying, responsive to an edit triggering operation with respect to a first effect, at least one effect-editing control corresponding to the first effect;
  receiving an effect editing operation applied to the at least one effect-editing control and displaying an edited applied result; and
  receiving an effect-generation triggering operation, generating a second effect corresponding to the applied result, and displaying an effect identifier of the second effect at a preset position.

In a second aspect, embodiments of the disclosure further provide an effect processing apparatus, comprising:
  an edit triggering module configured to display, responsive to an edit triggering operation with respect to a first effect, at least one effect-editing control corresponding to the first effect;
  an effect editing module configured to receive an effect editing operation applied to the at least one effect-editing control and display an edited applied result; and
  an effect generating module configured to receive an effect-generation triggering operation, generate a second effect corresponding to the applied result, and display an effect identifier of the second effect at a preset position.

In a third aspect, embodiments of the disclosure further provide an electronic device, comprising:
  one or more processors;
  a storage device configured to store one or more programs;
  wherein the one or more programs, when are executed by the one or more processors, cause the one or more processors to implement the effect processing method according to any embodiment of the disclosure In a fourth aspect, embodiments of the disclosure further provide a storage medium having a computer-executable instruction stored thereon, wherein the computer-executable instruction, when executed by a computer processor, is configured to perform the effect processing method according to any embodiment of the disclosure.

BRIEF DESCRIPTION OF THE DRAWINGS

The same or similar reference numerals throughout the drawings denote the same or similar elements. It is to be understood that the drawings are illustrative and that originals and elements are not necessarily drawn to scale. Among the drawings.

DETAILED DESCRIPTION OF EMBODIMENTS

Embodiments of the disclosure are described in more detail hereinafter with reference to drawings. Although some embodiments of the disclosure are shown in the drawings, it is to be understood that the disclosure may be implemented in various forms and should not be interpreted as being limited to the embodiments set forth herein. Conversely, these embodiments are provided for a more thorough and complete understanding of the disclosure. It is to be understood that the drawings and the embodiments of the disclosure are illustrative and not intended to limit the scope of the disclosure.

The various steps recorded in the method embodiments of the disclosure may be performed in a different order, and/or in parallel. Additionally, the method embodiments may include additional steps and/or omit the execution of illustrated steps. The scope of the disclosure is not limited in this respect.

As used herein, the term "comprise" and variations thereof are intended to be inclusive, that is, "including, but not limited to". The term "according to" is "at least partially according to". The term "one embodiment" means "at least one embodiment"; the term "another embodiment" means "at least one another embodiment"; and the term "some embodiments" means "at least some embodiments". Related definitions of other terms are given hereinafter.

References to "first", "second" and the like in the disclosure are merely intended to distinguish one from another apparatus, module, or unit and are not intended to limit the order or interrelationship of the functions performed by the apparatus, module, or unit.

References to modifications of "one" or "a plurality" mentioned in the disclosure are intended to be illustrative and not limiting; those skilled in the art should understand that "one" or "a plurality" should be understood as "one or more" unless clearly expressed in the context.

Names of messages or information exchanged between multiple apparatuses in embodiments of the disclosure are used for an illustrative purpose and are not to limit the scope of such messages or information.

Before implementing the technical solutions disclosed in various embodiments of the disclosure, the type of personal information, scope of use, scenario of use, and the like shall be informed to the user and authorization from the user shall be obtained in appropriate manners according to relevant laws and regulations.

For example, in response to receiving a proactive request from a user, a prompt is sent to the user to expressly prompt the user that the requested operation to perform will access and use personal information of the user, such that the user may autonomously select whether to provide personal information to software or hardware such as an electronic device, an application, a server, or a storage medium which performs operations of the technical solutions of the disclosure based on the prompt information.

As an alternative or non-limitative implementation manner, in response to reception of a proactive request from the user, the prompt sent to the user may for example be popped up and displayed in a textual manner in the popup window. In addition, the popup window may also bear a selection control for the user to select to "agree" or "reject" to provide personal information to the electronic device.

The process of informing and obtaining user authorization as noted supra is only schematic, constituting no limitation to implementation manners of the disclosure, and other manners satisfying relevant laws and regulations may also be applied to implement the disclosure.

The data (including, but not limited to, the data per se, and acquisition or use of data) referred to in the technical solutions should satisfy criteria set forth in concerned laws and regulations.

Figure 1:
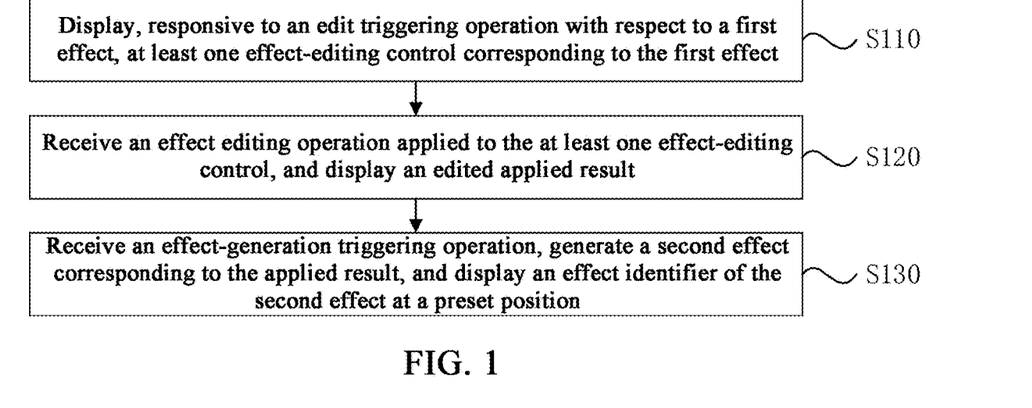
FIG. 1 is a schematic flow diagram of an effect processing method according to embodiments of the disclosure.

FIG. 1 is a schematic flow diagram of an effect processing method provided according to embodiments of the disclosure. Embodiments of the disclosure are applicable to scenarios of short-form video filming. The method may be performed by an effect processing apparatus. The apparatus may be implemented as software and/or hardware, and alternatively implemented as an electronic device which may be a mobile terminal, a PC (Personal Computer) terminal, or a server, etc.

As illustrated in FIG. 1, the method according to this embodiment may comprise:

S110: displaying, responsive to an edit triggering operation with respect to a first effect, at least one effect-editing control corresponding to the first effect.

The first effect may be understood as an effect which can undergo secondary creation. Optionally, the first effect may be a formalized effect template that can undergo personalized edition, which thus may also be referred to as a master effect. Content of the first effect may be preset as needed, which is not specifically limited herein. For example, the first effect may be an editable aesthetic-class effect template, a background filter-class effect template, or an add-class effect template, etc.

The edit triggering operation may be understood as a trigger operation for editing the first effect. Optionally, the edit triggering operation may be triggering an edit control of the first effect, or performing preset voice or gesture information for triggering start of editing the first effect. The edit triggering operation may be preset as needed, which is not specifically limited here. Exemplarily, the edit triggering operation may be clicking on a preset edit button corresponding to the first effect, or dragging the first effect into a preset edit area, or inputting a preset voice instruction such as "edit the first effect" via a voice input device.

The effect-editing control may be understood as a control for editing the first effect. The effect-editing control may take on various functional types and representation forms; the functional types and representation forms may be preset as needed, which are not specifically limited herein. Exemplarily, the effect-editing control may include at least one of text edit control, picture edit control, and voice edit control by functions. In this embodiment, the text edit control may be understood as a control for editing a text included in the first effect. The picture edit control may be understood as a control for editing a picture included in the first effect. The voice edit control may be understood as a control for editing voice included in the first effect.

For the first effect, an edit triggering operation corresponding to the first effect is performed; an edit interface of the first effect is accessed, and the effect-editing control such as the text edit control, the picture edit control, and the voice edit control available for editing the first effect is displayed on the edit interface of the first effect, and for the effect-editing control, a corresponding effect editing operation is performed so as to edit the first effect. In this way, personalized demands of users are satisfied and user experience is enhanced.

S120: receiving an effect editing operation applied to the at least one effect-editing control, and displaying an edited applied result.

The effect editing operation may be understood as an operation of editing the first effect based on an input of the effect-editing control. Optionally, the effect editing operation may refer to an editing operation with respect to the effect-editing control such as the text edit control, the picture edit control, and the voice edit control. Optionally, the effect editing operation includes at least one of the operations such as adding information, reducing information, modifying information, and viewing information with respect to relevant information in the first effect.

The editing operation with respect to the text edit control may refer to adding, deleting and/or modifying textual content of a textual editable item of the first effect. The editing operation with respect to the picture edit control may refer to adding, deleting, and/or modifying picture content of a picture editable item of the first effect, or editing a displaying manner of the picture via the picture edit control. Optionally, the displaying manner of the picture may refer to, but is not limited to, displaying position, displaying time, displaying speed, or displaying size of the picture. The editing operation with respect to the voice edit control may refer to adding, deleting, and/or modifying voice content of a voice editable item of the first effect.

In embodiments of the disclosure, by personalized editing of the first effect through the effect editing operations, individualized demands of users can be satisfied.

The applied result may be understood as an applied result upon completion of the effect editing operation with respect to the effect-editing control. By displaying the edited applied result upon reception of the effect editing operation applied to the at least one effect-editing control, the user may understand the edition condition more intuitively.

Optionally, the displaying an edited applied result comprises: determining a modified editable item in the first effect based on the effect-editing operation, determining modified data corresponding to the modified editable item, and updating the modified data to an effect packet of the first effect; executing an effect callback script with the updated data in the effect packet as an input parameter, generating the edited applied result, and displaying the applied result.

The editable item may be understood as a preset condition item for the first effect editable via a corresponding effect-editing control. In embodiments of the disclosure, the editable item of the first effect may be preset as needed, which is not specifically limited herein. For different first effects, their editable items may be different, and the first effect at least have one editable item. Optionally, the editable item may refer to an editable text item, an editable picture item, or an editable voice item in the first effect.

The modified data may be understood as data in the editable item modified through the effect editing operation. Optionally, the modified data may refer to, but is not limited to, text data, picture data, or voice data of the editable item modified through the effect editing operation. The modified data may be determined based on the effect editing operation, which is associated with individualized demands of users; specific content of the modified data is limited herein.

The effect packet may be understood as a software data packet including resources associated with the first effect. Exemplarily, the effect packet may include a protocol for describing the editable item of the first effect and control associated information of the effect-editing control corresponding to the editable item, and may further include the effect packet callback script for implementing edit logic of various items of information in the effect. In other words, the effect packet callback script may be understood as execution logic of generating, for the effect packet, a corresponding applied result based on the input parameter. The input parameter may be understood as an input parameter necessary for executing the effect packet callback script.

Exemplarily, the text data of the editable text item may be updated via the text edit control; furthermore, with the updated text data as the modified data, the modified data is copied into the effect packet of the first effect; with the updated text data as input parameter, the effect packet callback script is executed to generate applied result corresponding to the updated text data; and the applied result is displayed.

S130: receiving an effect-generation triggering operation, generating a second effect corresponding to the applied result, and displaying an effect identifier of the second effect at a preset position.

The effect-generation triggering operation may be understood as a trigger operation for generating the second effect. Optionally, the effect-generation triggering operation may refer to triggering a preset effect generation control (e.g., a control identified with a "save" identifier) for generating the second effect, or performing preset voice information or gesture information for generating the second effect. The generating manner of the effect-generation triggering operation may be preset as needed, which are not specifically limited here. For example, the effect-generation triggering operation may be clicking on a generate button of the second effecter effects effect, or inputting a voice instruction "generate second effect" via a voice input device.

The second effect may be understood as an effect generated after secondary creation via the effect editing operation. In a case that displaying of the applied result satisfies a preset condition, the effect-generation triggering operation is performed to generate a second effect corresponding to the applied result, and the effect identifier of the second effect is displayed at a preset position.

Upon generation of the second effect corresponding to the applied result, an effect identifier of the second effect may be generated, and the effect identifier of the second effect is displayed at the preset position.

The effect identifier may be understood as an identifier for identifying the generated second effect. The effect identifier may take on various representation forms. Optionally, the effect identifier may be, but is not limited to, a text identifier or an image identifier. For different effects, their effect identifiers may be different, which facilitates searching by users.

Exemplarily, the effect identifier of the second effect may be textual or numerical identifiers serving to distinguish different second effects, which may be a static-picture class identifier, or a dynamic image for displaying applied result of the second effect, or a label showing effect use instruction information of the second effect. In embodiments of the disclosure, the effect identifier of the second effect may be set according to actual needs, without limiting the specific representation form of the effect identifier of the second effect.

The preset position may be understood as a preset position for displaying the effect identifier of the second effect corresponding to the first effect, i.e., the position where the effect identifier of the second effect is displayed. Optionally, effect identifiers of the second effects corresponding to different first effects are displayed at the same display position; or for each first effect, the display position of the effect identifier of its corresponding second effect is set, i.e., the effect identifiers of the second effects corresponding to different first effects are displayed at different display positions.

Exemplarily, for each first effect, the effect identifier of the first effect and the effect identifier of its corresponding second effect may be correspondingly displayed by column or by hierarchy. For example, the entire effect identifier display area may be divided into two columns, where the effect identifier of the first effect is shown in one column, and the effect identifier of the second effect corresponding to the first effect is displayed in the other column. For another example, responsive to a hierarchical view triggering operation inputted for the first effect for viewing the second effect corresponding to the first effect, the effect identifier of the second effect corresponding to the first effect is displayed on the current display interface or on a jumped-to associated display interface.

Optionally, in a case of presence of effect identifiers of a plurality of second effects corresponding to the first effect, a preset number of effect identifiers of lately generated second effects may be displayed, while effect identifiers of remaining second effects are concealed. Optionally, display of the effect identifiers of the concealed second effects may be triggered in a preset trigger manner. For example, an effect switching trigger operation for switching to display effect identifiers of the second effects may be imputed to display the concealed effect identifiers of the second effects.

In embodiments of the disclosure, associated information of the second effect is further displayed in the application scenario of the second effect, facilitating the user to understand the second effect. Optionally, the effect processing method further comprises: displaying, in a case that an effect displaying resource is added with the second effect, in the effect displaying resource an effect link entry corresponding to the second effect; and receiving a link triggering operation with respect to the effect link entry, and displaying the effect identifier of the second effect and/or an effect identifier of the first effect corresponding to the second effect.

The effect displaying resource may be understood as a displaying resource generated after the second effect is applied to a multimedia resource. An effect link entry of the second effect may be added in the effect displaying resource, facilitating the user to view the associated information of the second effect via the effect link entry of the second effect.

The effect link entry may be understood as an entry which, once being triggered, may be linked to the associated information where the second effect is displayed. The link triggering operation may be understood as a trigger operation with respect to the effect link entry. Optionally, the link triggering operation may refer to an operation of clicking on the effect link entry.

Upon reception of the link triggering operation with respect to the effect link entry, the effect identifier of the second effect may be displayed, or the effect identifier of the first effect corresponding to the second effect may be displayed, or the effect identifier of the second effect and the effect identifier of the first effect corresponding to the second effect may be simultaneously displayed. Optionally, one or more effect displaying resources generated from applying the second effect and/or the first effect may also be displayed. In a case that a plurality of the effect displaying resources applied with the second effect and/or the first effect are to be displayed, the plurality of effect displaying resources may be displayed in an order based on information such as generation time and/or play heat of respective effect displaying resources.

In embodiments of the disclosure, the effect processing method may further comprise: receiving a filming triggering operation with respect to the second effect, displaying a filed image; displaying the second effect in the filmed image when it is detected that a preset effect displaying condition is met.

The filming triggering operation may be understood as a trigger operation of starting filming with the second effect being applied. For example, a "film the same" operation supporting the user to film with the same effect as the effect displaying resource. Optionally, the filming triggering operation may refer to an operation of triggering a filming control associated with the second effect. Exemplarily, the filming triggering operation may be clicking on a filming button of filming the same effect as the second effect or receiving a voice input instruction for instructing to film the effect displaying resource applied with the second effect. The filmed image may be understood as an image displayed during filming with the second effect being applied.

The preset effect displaying condition may be understood as a preset displaying condition which should be satisfied when applying the second effect for effect filming. The preset effect displaying condition may be preset based on different effect types and needs, which is not limited herein.

Optionally, the preset effect displaying condition may comprise at least one of: detecting a preset effect reference object; detecting that filming duration of the filmed image reaches a preset duration; detecting that a present type of scene object is present in the filmed image; and receiving a preset effect displaying instruction for displaying the second effect.

Exemplarily, in a case that the second effect is a facial aesthetic-class effect, the preset effect displaying condition may be detecting presence of a preset type of applied object in the filmed image; or, in a case that the second effect is a background filter-class effect, the preset effect displaying condition may be presence of the application background or completion of filming duration, etc.; or, in a case that the second effect is a dynamic video-class effect, the preset effect displaying condition may be presence of the applied object, performing a preset action by the applied object, and/or completion of the filming duration, etc.

In the technical solution of the embodiments of the disclosure, by displaying, responsive to an edit triggering operation with respect to a first effect, at least one effect-editing control corresponding to the first effect, an interactive interface with respect to the first effect is provided so as to perform individualized edition to the first effect; then, by receiving an effect edition operation applied to at least one effect-editing control and displaying an edited applied result, the editing progress of the first effect may be known in real time, such that subsequent operation guidance may be provided to the user based on the applied result. Finally, by receiving an effect-generation triggering operation, generating a second effect corresponding to the applied result, and displaying an effect identifier of the second effect at a preset position, the generated second effect is saved for reuse, repeated edition of the second effect is avoided while realizing the same applied result; this overcomes the monotonous rendering effect in short-form video filming, enriches displaying effects, increases fun of effect displaying, satisfies users' individualized demands on the effects, and enhances user experience and entertainment.

Figure 2:
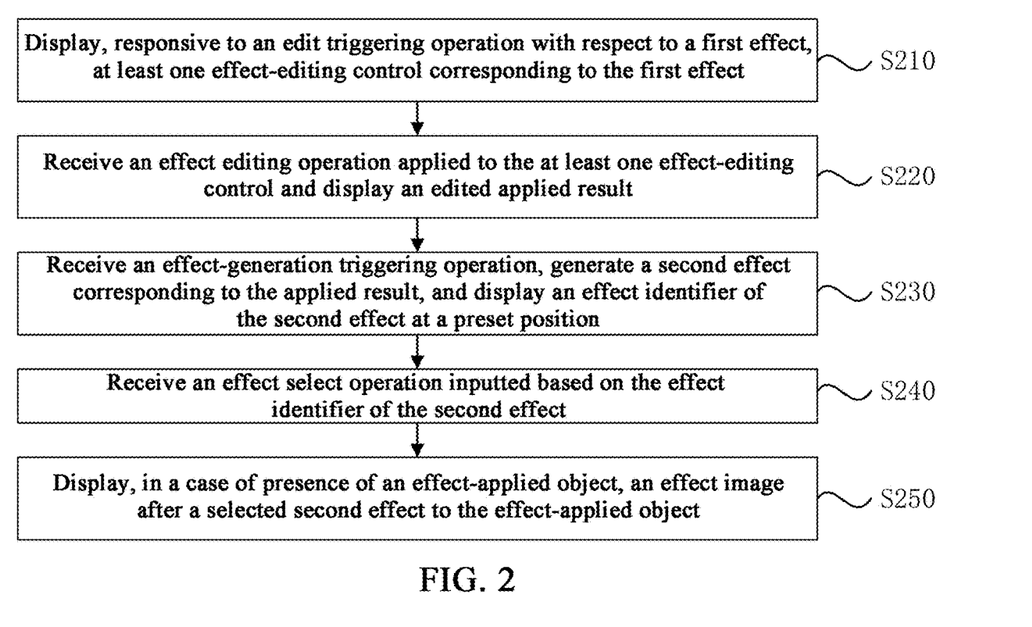
FIG. 2 is a schematic flow diagram of another effect processing method according to embodiments of the disclosure.

FIG. 2 is a schematic flow diagram of another effect processing method provided according to embodiments of the disclosure, this embodiment is explained based on the above embodiment.

As illustrated in FIG. 2, the method comprises:

S210: displaying, responsive to an edit triggering operation with respect to a first effect, at least one effect-editing control corresponding to the first effect;

S220: receiving an effect editing operation applied to the at least one effect-editing control and displaying an edited applied result;

S230: receiving an effect-generation triggering operation, generating a second effect corresponding to the applied result, and displaying an effect identifier of the second effect at a preset position;

S240: receiving an effect select operation inputted based on the effect identifier of the second effect.

Exemplarily, the effect select operation may refer to an operation of effect searching based on the effect identifier of the second effect, or an operation of triggering the effect identifier of the second effect, e.g., an operation of clicking on the effect identifier of the second effect.

In this operation, the second effect refers to a second effect generated based on the first effect, i.e., an effect generated from editing an existing effect. The second effect may be a second effect generated by the user's autonomous edition at the local user terminal, or a second effect shared by another user terminal to the local user terminal. The effect identifier of the second effect may be an effect identifier displayed at a preset position, or an effect identifier included in the effect sharing information shared by another user.

S250: displaying, in a case of presence of an effect-applied object, an effect image after applying a selected second effect to the effect-applied object.

The effect-applied object may be understood as a scene object associated with the second effect. An effect-applied object is generally associated with an effect reference material acquired. In embodiments of the disclosure, the effect-applied object may be, but is not limited to, an image captured by a camera or an uploaded image. Optionally, the effect-applied object may also be a preset type of scene subject in the image captured by the camera or the uploaded image. Optionally, the effect-applied object may be an area of the scene subject.

Upon triggering of the effect identifier of the second effect, the second effect is initiated. Optionally, in a case of detecting an effect-applied object corresponding to the second effect, the second effect is displayed corresponding to the effect-applied object. In embodiments of the disclosure, whether the effect-applied object is present may be determined by a preset detection algorithm corresponding to the effect-applied object.

The effect image after the second effect is applied to the effect-applied object is the effect image derived after the second effect is fused with the effect applied image including the effect-applied object.

The technical solution of this embodiment may selectively use the second effect which is generated corresponding to the applied result, thereby avoiding visually aesthetic fatigue caused by extensive application of the first effect, satisfying individualized applied result pursuits of users, and enriching application effects of the effects.

Figure 3:
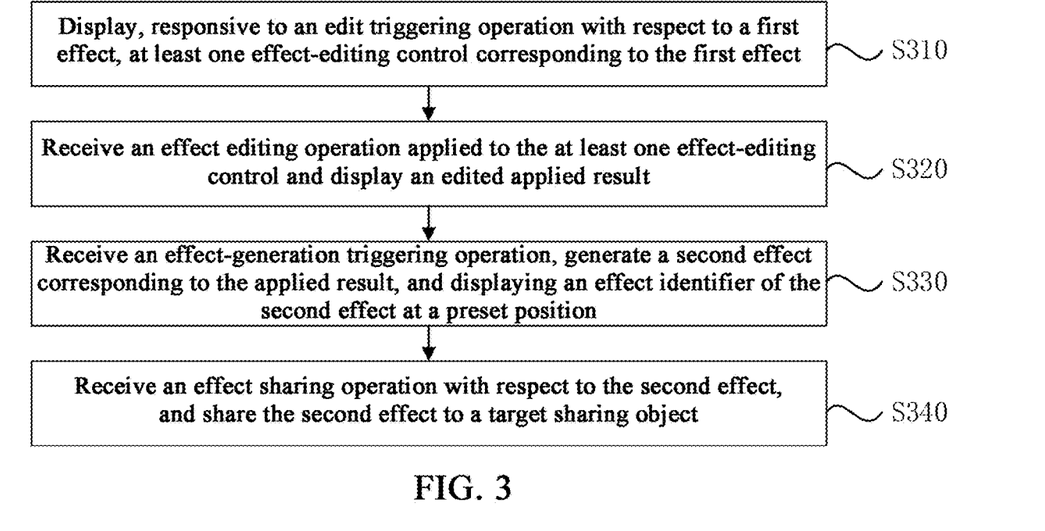
FIG. 3 is a schematic flow diagram of a further effect processing method according to embodiments of the disclosure.

FIG. 3 is a schematic flow diagram of a further effect processing method provided according to embodiments of the disclosure. This embodiment is a further extension of the application scenario of the second effect in the embodiments above, where an effect sharing function is additionally implemented based on relevant functions.

As illustrated in FIG. 3, the method according to this embodiment may comprise:

S310: displaying, responsive to an edit triggering operation with respect to a first effect, at least one effect-editing control corresponding to the first effect;

S320: receiving an effect editing operation applied to the at least one effect-editing control and displaying an edited applied result;

S330: receiving an effect-generation triggering operation, generating a second effect corresponding to the applied result, and displaying an effect identifier of the second effect at a preset position;

S340: receiving an effect sharing operation with respect to the second effect, and sharing the second effect to a target sharing object.

The effect sharing operation may be understood as an operation of sharing the second effect to an effect-applied object other than the current effect-applied object.

Receiving an effect sharing operation with respect to the second effect may refer to receiving an effect forward operation inputted for the effect identifier of the second effect. Optionally, effect sharing information is generated, an effect forward object is determined, and with the effect forward object as a target sharing object, the effect sharing information is shared to the target sharing object.

The effect sharing information may take on various forms, which, for example, may be, but is not limited to, an effect use authorization link, an effect use authorization password, or an effect use authorization code corresponding to the second effect.

The effect forward object may also be determined in a plurality of manners. Optionally, after receiving an effect sharing operation with respect to the second effect, at least one alternative sharing object is displayed, an object select operation with respect to the alternative sharing object is received, and the selected alternative sharing object is taken as the target sharing object.

In embodiments of the disclosure, sharing of the second effect between different applications may also be supported. Optionally, after receiving the effect sharing operation with respect to the second effect, an (alternative) third-party application available for the user to select is displayed, an application trigger operation of the user's clicking on the third-party application is received, and at least one alternative sharing object corresponding to the third-party application is displayed, then an object select operation with respect to the alternative sharing object is received, and the selected alternative sharing object is taken as the target sharing object.

The technical solution according to this embodiment can share the individualized edited second effect to the target sharing object in response to the effect sharing operation with respect to the second effect, which realizes targeted sharing of the effect between users, thereby extending an application scenario of the second effect, satisfying the user's sharing demand, and enhancing the user's use experience.

Figure 4:
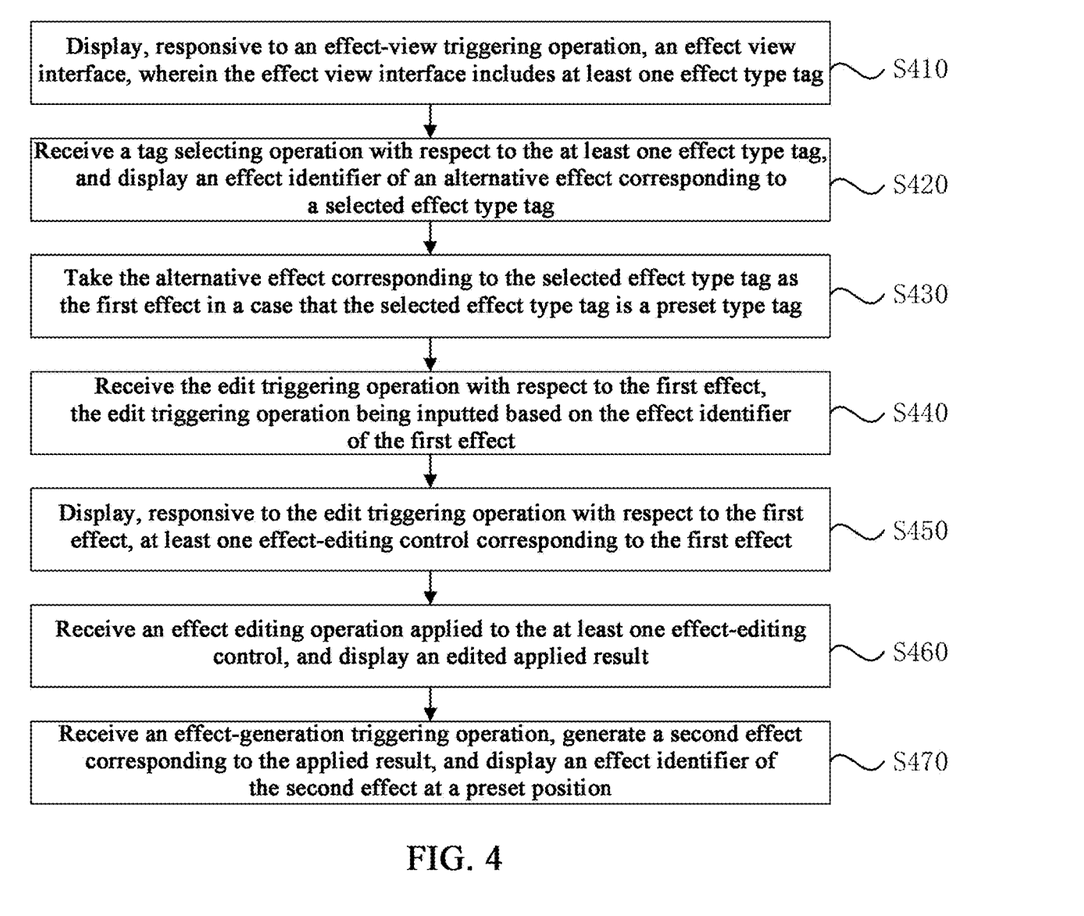
FIG. 4 is a schematic flow diagram of a still further effect processing method according to embodiments of the disclosure.

FIG. 4 is a schematic flow diagram of a still further effect processing method provided according to embodiments of the disclosure. This embodiment further explains how to determine the first effect in conjunction with the effect application scenario as described in the embodiments above.

As illustrated in FIG. 4, the method according to this embodiment may comprise:

S410: displaying, responsive to an effect-view triggering operation, an effect view interface, wherein the effect view interface includes at least one effect type tag.

The effect-view triggering operation may be understood as an operation triggered to view a effect. Optionally, the effect-view triggering operation may be a trigger operation applied to a preset effect view control, or an interface opening trigger operation with respect to the effect view interface.

Optionally, the effect view control may be set in a material publishing interface of an effect application program. A material-publishing trigger operation may be received, and a material acquisition interface is displayed, wherein an effect view control is displayed on the material acquisition interface, a trigger operation applied to the effect view control is received, and the effect view interface is displayed. The material acquisition interface herein may be configured to acquire a to-be-published material by real-time capturing or uploading. Optionally, the effect view interface may be displayed in such a manner that the effect view interface is displayed in an upper-layer area of the material acquisition interface, for example, displayed in part of the area proximal to the bottom of the material acquisition interface.

Optionally, the interface opening trigger operation with respect to the effect view interface may be, but is not limited to, an operation of searching the effect view interface, or, a trigger operation applied to a preset interface trigger control for opening the effect view interface.

In embodiments of the disclosure, the effect view interface is configured to display information associated with an alternative effect, available for the user to view and/or to use. In actual applications, in order to satisfy individualized demands of users, a variety of effects are always present, available for users to select. To facilitate the users to view, the alternative effects may be classified, so that an effect type flag is set for each type of alternative effects. Accordingly, in embodiments of the disclosure, the effect view interface may include at least one effect type tag. Optionally, the effect view interface may also include an alternative effect corresponding to a default displayed effect type tag.

The alternative effects may be classified in a plurality of manners, for example, classified based on the release time of the alternative effects, or classified based on adapted users of the alternative effects, or classified based on effect types of the alternative effects, or classified based on use data (e.g., use duration, use times, and/or the number of users) of the alternative effects. In embodiments of the disclosure, the manners of classifying the alternative effects may be set according to actual needs, which are not specifically limited herein. Exemplarily, effect type tags may be understood as identifiers for distinguishing different types of alternative effects, which may be textual or numerical. Similarly, in embodiments of the disclosure, the effect type tag corresponding to each type of alternative effects may be set based on actual needs, which is not limited herein.

S420: receiving a tag selecting operation with respect to the at least one effect type tag, and displaying an effect identifier of an alternative effect corresponding to a selected effect type tag.

The tag selecting operation may be understood as an operation for representing selection of an effect type tag. For example, it may be an operation of clicking on the effect type tag.

To facilitate searching for the alternative effect corresponding to each effect tag type, the tag identifier of the alternative effect is correspondingly displayed with its corresponding effect tag type. Optionally, the effect identifier of the alternative effect is displayed in an effect display list corresponding to the effect type tag that corresponds to the alternative effect. The effect display list may be displayed with the effect type tag in the same interface; or, after the effect type tag is triggered, a new interface is jumped to, where the effect display list is displayed.

S430: taking the alternative effect corresponding to the selected effect type tag as the first effect in a case that the selected effect type tag is a preset type tag.

Whether the effect type tag is selected or which tag is selected is a result of tag selecting operation. In embodiments of the disclosure, the alternative effect corresponding to the preset type tag supports the edited effect type tag. There may be one or more preset type tags.

The selected effect type tag may be compared with the preset type tag; if a preset type tag consistent with the selected effect type tag is present, the alternative effect corresponding to the effect type tag serves as the first effect.

S440: receiving the edit triggering operation with respect to the first effect, the edit triggering operation being inputted based on the effect identifier of the first effect.

The effect identifier of the first effect may be understood as identifier information for identifying different first effects. The effect identifier may be identification information displayed after the preset type tag in the effect type tags is triggered. As noted supra, the identification information may take on various forms. Exemplarily, the effect identifier of the first effect may be a textual or numerical type identifier for distinguishing different first effects, or a static-picture class identifier, or a dynamic image for displaying the applied result of the first effect, or a label for displaying effect use instruction information of the first effect. In embodiments of the disclosure, the effect identifier of the first effect may be set based on actual needs, and representation forms of the effect identifier of the first effect are not limited herein.

The edit triggering operation with respect to the first effect may be inputted via the effect identifier of the first effect. Exemplarily, an identifier triggering operation applied to the effect identifier of the first effect may be received, with the identifier triggering operation serving as the edit triggering operation with respect to the first effect; or, an identifier select operation applied to the effect identifier of the first effect is received, and then an effect confirmation operation applied to a preset effect confirming control is received, in which case, it is determined that the edit triggering operation with respect to the first effect is received. The identifier triggering operation may be, but is not limited to, an operation of clicking on the effect identifier, an operation of pressing the effect identifier, an operation of boxing-in the effect identifier, an operation of checking the effect identifier, or an operation of dragging the effect identifier. The effect confirming operation may be, but is not limited to, an operation of clicking on the effect confirm control, an operation of pressing the effect confirm control, an operation of sliding the effect confirm control, or an operation of dragging the effect confirm control.

S450: displaying, responsive to the edit triggering operation with respect to the first effect, at least one effect-editing control corresponding to the first effect.

S460: receiving an effect editing operation applied to the at least one effect-editing control, and displaying an edited applied result.

S470: receiving an effect-generation triggering operation, generating a second effect corresponding to the applied result, and displaying an effect identifier of the second effect at a preset position.

With an effect type tag to distinguish whether an effect is editable, the technical solution of this embodiment may conveniently and quickly find the editable first effect via a simple interactive operation during use; for example in a multi-effect scenario including both editable and non-editable effects, the technical solution of this embodiment can quickly respond to satisfy users' individualized effect edit demands.

Figure 5:
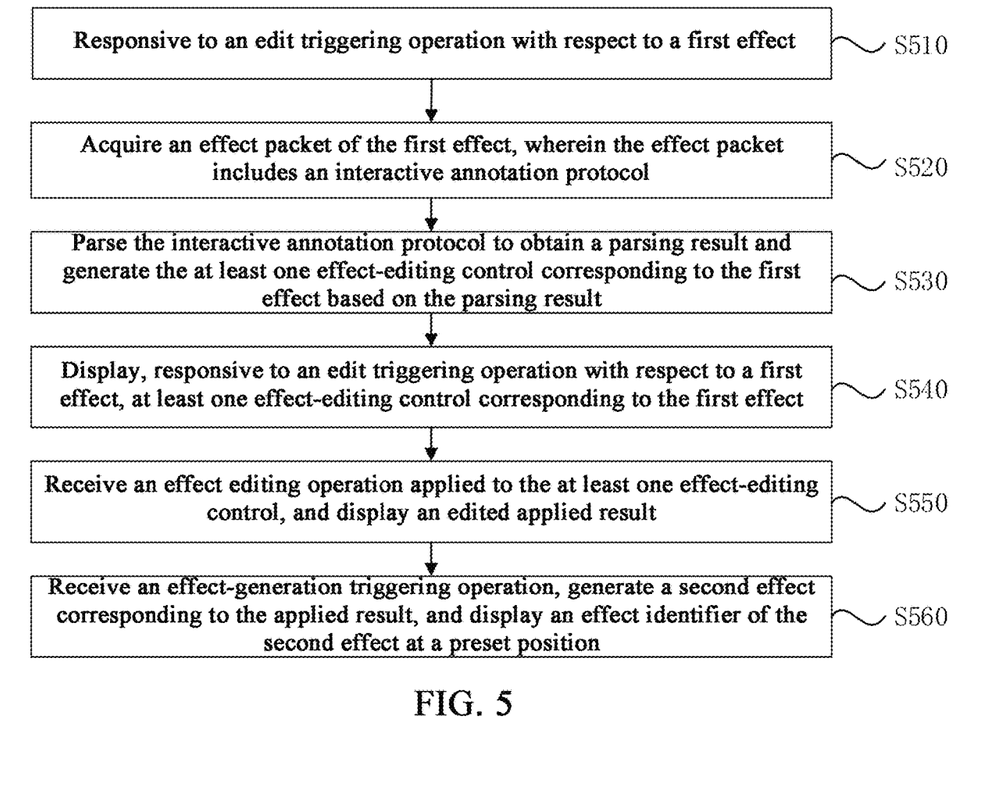
FIG. 5 is a schematic flow diagram of a yet further effect processing method according to embodiments of the disclosure.

FIG. 5 is a schematic flow diagram of a yet further effect processing method according to embodiments of the disclosure; this embodiment explains how to generate to-be-displayed at least one effect-editing control corresponding to the first effect in the embodiments above.

As illustrated in FIG. 5, the method according to this embodiment may comprise:

S510: responsive to an edit triggering operation with respect to a first effect;

S520: acquiring an effect packet of the first effect, wherein the effect packet includes an interactive annotation protocol.

In embodiments of the disclosure, the interactive annotation protocol is used to describe an editable item of the first effect and control associated information of the effect-editing control corresponding to the editable item. The control associated information at least includes a display manner of the effect-editing control in the effect-editing interface and edit data supported by the effect-editing control.

The editable item may be understood as an information item editable in an interactive manner in the information items displayed by the first effect, or may be understood as a slot editable in the slots corresponding to the information items displayed by the first effect. The information item may be understood as an item of information of the first effect, which may for example be information corresponding to one slot. In embodiments of the disclosure, the information included in the first effect may be pre-divided into one or more information items. Exemplarily, various items of information included in the first effect may be divided into different information items based on the information type (e.g., text, picture, video or audio, etc.) or may be divided into different information items based on information display positions.

A plurality of manners may be leveraged to divide the information included in the first effect into a plurality of information item; the manners described supra are only exemplary, not intended for limiting; a dividing manner may be set dependent on actual needs.

The manner of displaying the effect-editing control in the effect-editing interface may include, but is not limited to, a pattern (e.g., progress bar, slide knob, button control, breathing light type control, single-input control, or an input control with scroll-down options), color, size, or display position of the effect-editing control. The edit data supported by the effect-editing control may include, but is not limited to, data type and editing rule of the edit data. The data type may include at least one of text, number, symbol, static or dynamic picture, animated sequential frame, video, or audio. The editing rule may include, but is not limited to, value range of the number, limitation in the number of bits to be inputted, characters limited, and data structure, etc.

In embodiments of the disclosure, the effect packet of the first effect may include one or more interactive annotation protocols corresponding to the first effect. For example, the effect packet of the first effect includes different versions of interactive annotation protocols; or, different annotation protocols may be set for different information items.

Optionally, the effect packet includes an effect annotation protocol, the effect annotation protocol being at least configured to describe protocol acquisition information of the interactive annotation protocol corresponding to the first effect. This setting has an advantage of quickly locating the desired interactive annotation protocol, particularly suitable for a scenario where the effect packet includes a plurality of interactive annotation protocols.

The protocol acquisition information may be understood as information configured to instruct how to acquire the interactive annotation protocol, or indication information configured to indicate which interactive annotation protocol is to be acquired, which may for example be acquisition path information of the interactive annotation protocol, or identification information of the interactive annotation protocol.

S530: parsing the interactive annotation protocol to obtain a parsing result and generating the at least one effect-editing control corresponding to the first effect based on the parsing result.

The interactive annotation protocol is parsed to obtain the editable item of the first effect and control associated information of the effect-editing control corresponding to the editable item; further, at least one effect-editing control corresponding to the first effect is generated based on the editable item and the control associated information.

In embodiments of the disclosure, by parsing the interactive annotation protocol, the editable item of the first effect may be obtained, and then control associated information of the effect-editing control corresponding to the editable item is obtained, i.e., by parsing the interactive annotation protocol, a control data model of the effect-editing control may be obtained. Optionally, a target control may be matched in a pre-established control pool based on the control data model, whereby the target control is placed on the effect-editing interface.

The effect-editing control is configured to edit the corresponding editable item. The correspondence relationship between the editable item and the effect-editing control may be a one-to-one relationship, or a one-to-multiple relationship, or a multiple-to-one relationship.

Optionally, in a case that the effect packet includes an effect annotation protocol, the method further comprises before the parsing the interactive annotation protocol: parsing the effect annotation protocol to obtain protocol acquisition information of the interactive annotation protocol corresponding to the first effect, and then acquiring the interactive annotation protocol corresponding to the first effect based on the protocol acquisition information.

The effect annotation protocol may be stored in a root directory of the effect packet so as to be quickly found.

For example, the effect annotation protocol according to embodiments of the disclosure may be configured to describe whether the first effect is editable, in which interactive annotation protocol(s) the editable slot information is described, and which version of the interactive annotation protocol is to be used. For example, the effect annotation protocol may provide a searching path (i.e., protocol acquisition information) of the interactive annotation protocol, and then the interactive annotation protocol is found based on the searching path. The searching path of the interactive annotation protocol is not an absolute path, but a relative path, i.e., a path relative to the root directory of the effect packet. The interactive annotation protocol may also describe the version of the interactive annotation protocol, describe which scene in the effect packet the effect packet, when running, will be linked to, and describe which slot(s) are editable slot(s).

S540: displaying at least one effect-editing control corresponding to the first effect.

Exemplarily, the effect-editing control is rendered on the effect-editing interface so as to be displayed to the user, whereby an interactive tool is provided.

S550: receiving an effect editing operation applied to the at least one effect-editing control, and displaying an edited applied result.

S560: receiving an effect-generation triggering operation, generating a second effect corresponding to the applied result, and displaying an effect identifier of the second effect at a preset position.

By adding an interactive annotation protocol in the effect packet, the technical solution of this embodiment may realize a simple and convenient configuration of the editable item of the first effect and the control associated information of the effect-editing control corresponding to the editable item, which can provide a technical support for changing an existing non-editable effect to an editable effect type. Moreover, the implementation via an annotation protocol realizes decoupling from the implementation logic code of the effect, facilitating subsequent modification and maintenance, thereby saving effect development overheads.

Figure 6:
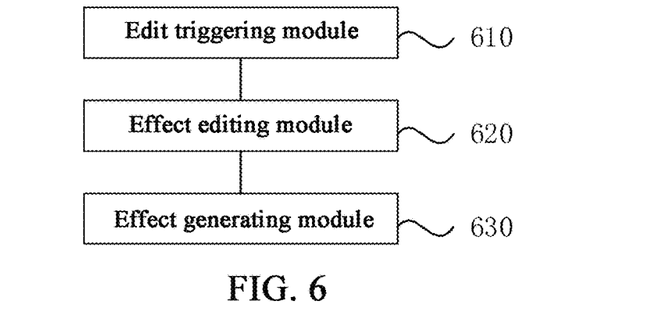
FIG. 6 is a structural schematic diagram of an effect processing apparatus according to embodiments of the disclosure.

FIG. 6 is a structural schematic diagram of an effect processing apparatus according to embodiments of the disclosure. As illustrated in FIG. 6, the apparatus comprises: an edit triggering module 610, an effect editing module 620, and an effect generating module 630.

The edit triggering module 610 is configured to display, responsive to an edit triggering operation with respect to a first effect, at least one effect-editing control corresponding to the first effect; the effect editing module 620 is configured to receive an effect editing operation applied to the at least one effect-editing control and display an edited applied result; and the effect generating module 630 is configured to receive an effect-generation triggering operation, generate a second effect corresponding to the applied result, and display an effect identifier of the second effect at a preset position.

In the technical solution of the embodiments of the disclosure, by displaying, responsive to an edit triggering operation with respect to a first effect, at least one effect-editing control corresponding to the first effect, an interactive interface with respect to the first effect is provided so as to perform individualized edition to the first effect; then, by receiving an effect edition operation applied to at least one effect-editing control and displaying an edited applied result, the editing progress of the first effect may be known in real time, such that subsequent operation guidance may be provided to the user based on the applied result. Finally, by receiving an effect-generation triggering operation, generating a second effect corresponding to the applied result, and displaying an effect identifier of the second effect at a preset position, the generated second effect is saved for reuse, repeated edition of the second effect is avoided while realizing the same applied result; this overcomes the monotonous rendering effect in short-form video filming, enriches displaying effects, increases fun of effect displaying, satisfies users' individualized demands on the effects, and enhances user experience and entertainment.

Optionally, the effect generating module 630 is further configured to: after the displaying an effect identifier of the second effect at a preset position, receive an effect selecting operation inputted based on the effect identifier of the second effect; and display, in a case of presence of an effect-applied object, an effect image after a selected second effect is applied to the effect-applied object.

Optionally, the effect generating module 630 is further configured to: after the displaying an effect identifier of the second effect at a preset position, receive an effect sharing operation with respect to the second effect, and share the second effect to a target sharing object.

Optionally, the edit triggering module 610 is further configured to: before the responsive to an edit triggering operation with respect to a first effect, display, responsive to an effect-view triggering operation, an effect view interface, wherein the effect view interface includes at least one effect type tag; receive a tag selecting operation with respect to the at least one effect type tag, and display an effect identifier of an alternative effect corresponding to a selected effect type tag; take the alternative effect corresponding to the selected effect type tag as the first effect in a case that the selected effect type tag is a preset type tag; and receive the edit triggering operation with respect to the first effect, the edit triggering operation being inputted based on the effect identifier of the first effect.

Optionally, the apparatus further comprises an effect packet acquiring module and an effect-editing control generating module.

The effect packet acquiring module is configured to acquire, before the displaying at least one effect-editing control corresponding to the first effect, an effect packet of the first effect, wherein the effect packet includes an interactive annotation protocol; and the effect-editing control generating module is configured to parse the interactive annotation protocol and generate the at least one effect-editing control corresponding to the first effect based on a parsing result.

Optionally, the effect packet includes an effect annotation protocol, the effect annotation protocol being at least configured to describe protocol acquisition information of the interactive annotation protocol corresponding to the first effect; the effect-editing control generating module is further configured to: before the effect-editing control generating module, parse the effect annotation protocol to obtain protocol acquisition information of the interactive annotation protocol corresponding to the first effect, and acquire the interactive annotation protocol corresponding to the first effect based on the protocol acquisition information.

Optionally, the interactive annotation protocol is configured to describe an editable item of the first effect and control associated information of the effect-editing control corresponding to the editable item, the control associated information at least including a display manner of the effect-editing control at the effect edit interface and edit data supported by the effect-editing control; the effect-editing control generating module is configured to parse the interactive annotation protocol to obtain a parsing result and generate the at least one effect-editing control corresponding to the first effect by the following manner: parsing the interactive annotation protocol to obtain an editable item of the first effect and control associated information of the effect-editing control corresponding to the editable item; and generating the at least one effect-editing control corresponding to the first effect based on the editable item and the control associated information.

Optionally, the effect editing module 620 is configured to display the edited applied result by the following manner: determining a modified editable item in the first effect based on the effect editing operation, determining modified data corresponding to the modified editable item, and updating the modified data to the effect packet of the first effect; executing an effect callback script with the updated data in the effect packet as an input parameter, generating the edited applied result, and display the applied result.

Optionally, the effect processing apparatus further comprises an effect displaying resource module: configured to: display, in a case that the effect displaying resource is added with the second effect, in the effect displaying resource an effect link entry corresponding to the second effect; and receive a link triggering operation with respect to the effect link entry, and display the effect identifier of the second effect and/or an effect identifier of the first effect corresponding to the second effect.

Optionally, the effect processing apparatus further comprises a filmed image displaying module configured to: receive a filming triggering operation with respect to the second effect and display the filmed image; and display the second effect in the filmed image when it is detected that a preset effect displaying condition is met.

The effect processing apparatus provided by embodiments of the disclosure may perform the effect processing method provided according to any embodiment of the disclosure and has corresponding functional modules for performing the method as well as relevant advantages.

The various units and modules comprised in the apparatus are only partitioned according to functional logics, and the disclosure is not limited to the partitions above, so long as concerned functions can be implemented; in addition, specific names of respective functional units are only provided to facilitate distinguishing from each other, not intended to limit the scope of protection of the embodiments of the disclosure.

Figure 7:
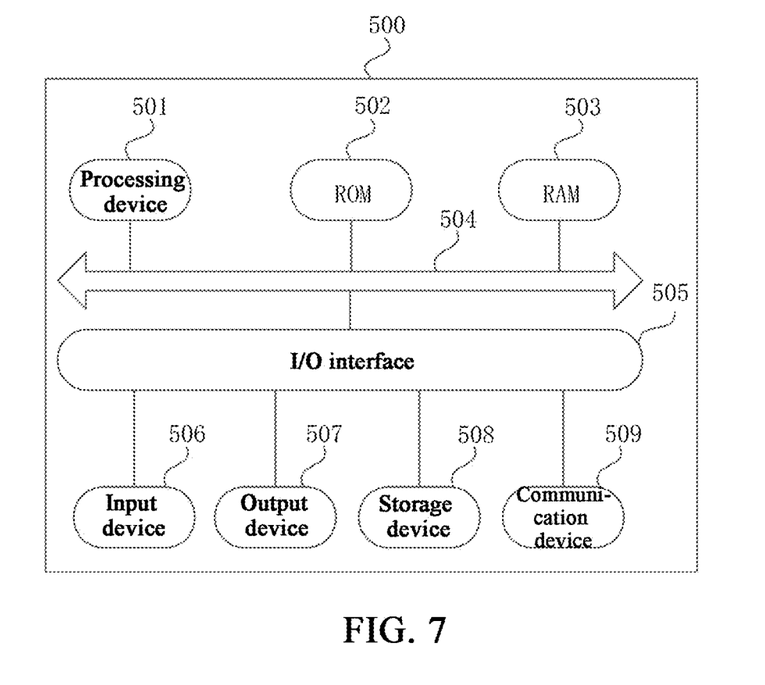
FIG. 7 is a structural schematic diagram of an electronic device for generating an effect according to embodiments of the disclosure

FIG. 7 illustrates a structural schematic diagram of an electronic device according to embodiments of the disclosure. Refer to FIG. 7, which illustrates an electronic device (e.g., a terminal device or a server illustrated in FIG. 7) 500 adapted to implement the embodiments of the disclosure. The terminal device referred to in the embodiments of the disclosure may include, but is not limited to, a mobile terminal such as a mobile device, a handheld or laptop device, a digital broadcast receiver, a PDA (Personal Digital Assistant), a PAD (Tablet), a PMP (Portable Media Player), or a vehicle-mounted terminal (e.g., a vehicle-mounted navigation terminal), and a fixed terminal such as a digital TV or a table computer. The electronic device illustrated in FIG. 7 is only exemplary, which should not constitute any limitation to the functions and scope of use of the embodiments of the disclosure.

As illustrated in FIG. 7, the electronic device 500 may comprise a processing device (e.g., a CPU, a GPU, etc.) 501, which may execute various suitable actions and processing based on the program stored in a read-only memory (ROM) 502 or a program loaded in the random-access memory (RAM) 503 from a storage device 508. The RAM 503 can also store all kinds of programs and data necessary to operation of the electronic device 500. The CPU 501, ROM 502 and RAM 503 are interconnected to each other via a bus 504. The input/output (I/O) interface 505 is also connected to the bus 504.

Generally, the following devices may be connected to the I/O interface 505: an input device 506 including, e.g., a touch screen, a touch pad, a keypad, a mouse, a camera, a microphone, an accelerometer, or a gyroscope; an output device 507, e.g., a LCD (Liquid Crystal Display), a loudspeaker, or a vibrator; a storage device 508 such as a magnetic tape, a hard disk; and a communication device 509. The communication device 509 allows the electronic device 500 to exchange information/data with other devices via wireless or cable communication. Although the electronic device 500 comprising various components is shown in FIG. 7, it is not required to implement or possess all of the illustrated components. Alternatively, more or less components may be implemented or possessed.

According to the embodiments of the disclosure, the processes described with reference to the above flow diagrams may be implemented as computer software programs. For example, embodiments of the disclosure comprise a computer program product comprising a computer program carried on the computer-readable medium, the computer program including program code for performing the methods illustrated in the flow diagrams. In such embodiments, the computer program may be downloaded and installed from the network via the communication device 509, or installed from the storage device 508, or installed from the ROM 502. When the computer program is executed by the processing device 501, the actions limited in the methods according to the embodiments of the disclosure are implemented.

Names of messages or information exchanged between multiple apparatuses in embodiments of the disclosure are used for an illustrative purpose and are not to limit the scope of such messages or information.

The electronic device provided according to embodiments of the disclosure and the effect processing method provided according to the embodiments above relate to the same inventive idea, and those technical details not elaborated in this embodiment may refer to the embodiments above; this embodiment offers the same benefits as the embodiments above.

Embodiments of the disclosure provide a computer storage medium on which a computer program is stored, the computer program, when being executed by a processor, implementing the effect processing method provided by the embodiments above.

The computer-readable medium described supra may be a computer-readable signal medium or a computer-readable storage medium or any combination of the above two. The computer-readable storage medium for example may be, but is not limited to, electric, magnetic, optical, electro-magnetic, infrared or semiconductor system, apparatus or device, or any combination thereof. More specific examples of the computer-readable storage medium include, but are not limited to, an electric connection via one or more wires, a portable computer magnetic disk, hard disk, random access memory (RAM), read-only memory (ROM), erasable programmable read-only memory (EPROM) or flash memory, optical fiber, portable compact-disc read-only memory (CD-ROM), optical storage device, magnetic storage device, or any appropriate combination thereof. In the disclosure, the computer-readable storage medium may refer to any tangible medium including or storing a program that can be used by an instruction executing system, apparatus or device or used by a combination thereof. However, in the disclosure, the computer-readable signal medium may include a data signal in the base band or propagated as a part of carrier, in which the computer-readable program code is carried. This propagated data signal may take on various forms, including, but not limited to, an electromagnetic signal, an optical signal, or any suitable combination thereof. The computer-readable signal medium may also be any computer-readable medium other than the computer-readable storage medium, which computer-readable signal medium may transmit, propagate, or transfer a program used by the instruction executing system, apparatus or device, or used in combination therewith. The program code stored on the computer-readable medium may be transmitted via any appropriate medium including, but is not limited to, wire, cable, RF (Radio Frequency), etc., or any appropriate combination thereof.

In some embodiments, the client and the server may communicate using any currently known or future developed network protocols such as HTTP (HyperText Transfer Protocol), and may be interconnected with a digital data communication (e.g., communication network) of any form or medium. Examples of the communication network include a local area network ("LAN"), a wide area network ("WAN"), a network of networks (e.g., the Internet), and peer-to-peer network (e.g., an ad hoc peer-to-peer network), and any currently known or future developed network.

The computer-readable medium may be included in the electronic device, or may be standalone, without being installed in the electronic device.

The computer-readable medium carries one or more programs; when the one or more programs are executed by the electronic device, the electronic device is caused to: display, responsive to an edit triggering operation with respect to a first effect, at least one effect-editing control corresponding to the first effect; receive an effect editing operation applied to the at least one effect-editing control and display an edited applied result; and receive an effect-generation triggering operation, generate a second effect corresponding to the applied result, and display an effect identifier of the second effect at a preset position.

The computer-program code for performing the operations of the disclosure may be compiled with one or more programming languages or a combination thereof; the programming languages comprise object-oriented programming languages, e.g., Java, Smalltalk, C++, and further comprise traditional procedural programming languages, such as "C" language or similar programming languages. The program code can be implemented completely on the user computer, partially on the user computer, as an independent software packet, partially on the user computer and partially on the remote computer, or completely on the remote computer or server. In a scenario where a remote computer is involved, the remote computer can be connected to the user computer via any type of network, including local area network (LAN) and wide area network (WAN), or to the external computer (e.g., connected via Internet using the Internet service provider).

The flow diagrams and block diagrams in the drawings illustrate system architecture, functions and operations that may be implemented by the system, method and computer program product according to various embodiments of the disclosure. In this regard, each block in the flow diagram or block diagram can redisplay a module, a program snippet, or a part of code, wherein the module, the program snippet, or the part of code includes one or more executable instructions for performing specified logic functions. In some alternative implementations, the functions indicated in the blocks can also occur in an order different from those indicated in the drawings. For example, two successively redisplayed blocks can be actually executed in parallel and sometimes in a reverse order dependent on the concerned functions. Each block in the block diagram and/or flow diagram and a combination of the blocks in the block diagram and/or flow diagram may be implemented by a dedicated hardware-based system for executing specified functions or actions, or implemented by a combination of dedicated hardware and computer instructions.

The units described in the embodiments of the disclosure may be implemented in a software manner or in a hardware manner, wherein the names of the units do not constitute limitation to the unit per se in some circumstances. For example, a first acquiring unit may also be described as "a unit for acquiring at least two internet protocol addresses."

The functions described herein may be executed at least partially by one or more hardware logic components. For example, an example hardware logic component that may be used includes, but is not limited to, a field programmable gate array (FPGA), an application-specific integrated circuit (ASIC), an application-specific standard product (ASSP), a system-on-chip (SOC), and a complex programmable logic device (CPLD), etc.

Within the context of the disclosure, the machine-readable medium may be any tangible medium including or storing programs for or related to the instruction execution system, apparatus, or device. The machine readable medium may include, but not limited to, electronic, magnetic, optical, electro-magnetic, infrared or semiconductor system, apparatus or device, or any combination thereof. More specific examples of the machine-readable storage medium include an electric connection via one or more wires, a portable computer magnetic disk, a hard disk, RAM, ROM, EPROM or flash memory, optical fiber, portable CD-ROM, an optical storage device, a magnetic storage device, or any appropriate combination thereof.

According to one or more embodiments of the disclosure, [example 1] provides an effect processing method, comprising: displaying, responsive to an edit triggering operation with respect to a first effect, at least one effect-editing control corresponding to the first effect; receiving an effect editing operation applied to the at least one effect-editing control and displaying an edited applied result; and receiving an effect-generation triggering operation, generating a second effect corresponding to the applied result, and displaying an effect identifier of the second effect at a preset position.

According to one or more embodiments of the disclosure, in [example 2], according to the method in example 1, the method further comprises: receiving an effect selecting operation inputted based on the effect identifier of the second effect; displaying, in a case of presence of an effect-applied object, an effect image after a selected second effect is applied to the effect-applied object.

According to one or more embodiments of the disclosure, in [example 3], according to the method in example 1, the method further comprises: receiving an effect sharing operation with respect to the second effect, and sharing the second effect to a target sharing object.

According to one or more embodiments of the disclosure, in [example 4], according to the method in example 1, the method further comprises: displaying, responsive to an effect-view triggering operation, an effect view interface, wherein the effect view interface includes at least one effect type tag; receiving a tag selecting operation with respect to the at least one effect type tag, and displaying an effect identifier of an alternative effect corresponding to a selected effect type tag; taking the alternative effect corresponding to the selected effect type tag as the first effect in a case that the selected effect type tag is a preset type tag; and receiving the edit triggering operation with respect to the first effect, the edit triggering operation being inputted based on the effect identifier of the first effect.

According to one or more embodiments of the disclosure, in [example 5], according to the method in example 1, the method further comprises: acquiring an effect packet of the first effect, wherein the effect packet includes an interactive annotation protocol; and parsing the interactive annotation protocol to obtain a parsing result and generating the at least one effect-editing control corresponding to the first effect based on the parsing result.

According to one or more embodiments of the disclosure, in [example 6], according to the method in example 5, the effect packet includes an effect annotation protocol, the effect annotation protocol being at least configured to describe protocol acquisition information of the interactive annotation protocol corresponding to the first effect; and the method further comprises: parsing the effect annotation protocol to obtain protocol acquisition information of the interactive annotation protocol corresponding to the first effect, and acquiring the interactive annotation protocol corresponding to the first effect based on the protocol acquisition information.

According to one or more embodiments of the disclosure, in [example 7], according to the method in example 5, the interactive annotation protocol is configured to describe an editable item of the first effect and control associated information of the effect-editing control corresponding to the editable item, the control associated information at least including a display manner of the effect-editing control at the effect-editing interface and edit data supported by the effect-editing control; and the parsing the interactive annotation protocol to obtain a parsing result and generating the at least one effect-editing control corresponding to the first effect based on the parsing result comprises: parsing the interactive annotation protocol to obtain an editable item of the first effect and control associated information of the effect-editing control corresponding to the editable item; and generating the at least one effect-editing control corresponding to the first effect based on the editable item and the control associated information.

According to one or more embodiments of the disclosure, in [example 8], according to the method in example 1, the displaying an edited applied result comprises: determining a modified editable item in the first effect based on the effect editing operation, determining modified data corresponding to the modified editable item, and updating the modified data to the effect packet of the first effect; executing an effect callback script with the updated data in the effect packet as an input parameter, generating the edited applied result, and displaying the applied result.

According to one or more embodiments of the disclosure, in [example 9], according to the method in example 1, the method further comprises: displaying, in a case that an effect displaying resource is added with the second effect, in the effect displaying resource an effect link entry corresponding to the second effect; and receiving a link triggering operation with respect to the effect link entry, and displaying the effect identifier of the second effect and/or an effect identifier of the first effect corresponding to the second effect.

According to one or more embodiments of the disclosure, in [example 10], according to the method in example 1, the method further comprises: receiving a filming triggering operation with respect to the second effect and displaying a filmed image; displaying the second effect in the filmed image when it is detected that a preset effect displaying condition is met.

According to one or more embodiments of the disclosure, [example 11] provides an effect processing apparatus, comprising: an edit triggering module configured to display, responsive to an edit triggering operation with respect to a first effect, at least one effect-editing control corresponding to the first effect; an effect editing module configured to receive an effect editing operation applied to the at least one effect-editing control and display an edited applied result; and an effect generating module configured to receive an effect-generation triggering operation, generate a second effect corresponding to the applied result, and display an effect identifier of the second effect at a preset position.

According to one or more embodiments of the disclosure, [example 12] provides an electronic device for generating an effect, comprising: one or more processors; a storage device configured to store one or more programs; wherein the one or more programs, when are executed by the one or more processors, cause the one or more processors to implement the effect processing method according to any one of examples 1 to 10.

According to one or more embodiments of the disclosure, [example 13] provides a storage medium for a generated effect, comprising: the computer-executable instruction, when executed by a computer processor, is configured to perform the effect processing method according to any one of examples 1 to 10.

Although various operations are described in a specific order, it should not be construed such that these operations must be performed in the specific order as illustrated or in a sequential order. In certain circumstances, multi-task parallel processing can be advantageous. Likewise, although a plurality of specific implementation details have been described supra, these details should not be construed as limiting the scope of the disclosure. Some features described within the context of individual embodiments may also be combined to be implemented in a single embodiment. Various features described within the context of a single embodiment may also be implemented in a plurality of embodiments separately or in any appropriate sub-combination manner.

Although the subject matter has been described with languages specific to structural features and/or method logic actions, it would be understood that the subject matter limited in the appended claims is not necessarily limited to the specific features or actions described supra. On the contrary, the specific features and actions described supra are only exemplary forms of implementing the claims.

We claim:

1. An effect processing method, comprising:
    displaying, responsive to an effect-view triggering operation, an effect view interface, wherein the effect view interface includes at least one effect type tag;
    receiving a tag selecting operation with respect to the at least one effect type tag, and displaying an effect identifier of an alternative effect corresponding to a selected effect type tag;
    taking the alternative effect corresponding to the selected effect type tag as a first effect in a case that the selected effect type tag is a preset type tag;
    receiving an edit triggering operation with respect to the first effect, the edit triggering operation being inputted based on the effect identifier of the first effect;
    displaying, responsive to receiving the edit triggering operation, at least one editing control corresponding to the first effect;
    displaying, responsive to receiving an editing operation applied to the at least one editing control, the applied result corresponding to the edited effect; and
    generating, responsive to receiving a generation operation, a second effect corresponding to the applied result, and displaying an identifier of the second effect at a preset position.

2. The effect processing method according to claim 1, further comprising, after the displaying an effect identifier of the second effect at a preset position:
    receiving an effect selecting operation inputted based on the effect identifier of the second effect; and
    displaying, in a case of presence of an effect-applied object, an effect image after a selected second effect is applied to the effect-applied object.

3. The effect processing method according to claim 1, further comprising:
    after the displaying an effect identifier of the second effect at a preset position, receiving an effect sharing operation with respect to the second effect, and sharing the second effect to a target sharing object.

4. The effect processing method according to claim 1, further comprising, before the displaying at least one effect-editing control corresponding to the first effect:
    acquiring an effect packet of the first effect, wherein the effect packet includes an interactive annotation protocol; and
    parsing the interactive annotation protocol to obtain a parsing result and generating the at least one effect-editing control corresponding to the first effect based on the parsing result.

5. The effect processing method according to claim 4,
    wherein the effect packet further includes an effect annotation protocol, the effect annotation protocol being at least configured to describe protocol acquisition information of the interactive annotation protocol corresponding to the first effect; and
    wherein the effect processing method further comprises, before parsing the interactive annotation protocol to obtain a parsing result, parsing the effect annotation protocol to obtain protocol acquisition information of the interactive annotation protocol corresponding to the first effect, and acquiring the interactive annotation protocol corresponding to the first effect based on the protocol acquisition information.

6. The effect processing method according to claim 4, wherein the interactive annotation protocol is configured to describe an editable item of the first effect and control associated information of the effect-editing control corresponding to the editable item, the control associated information at least including a display manner of the effect-editing control at the effect-editing interface and edit data supported by the effect-editing control; and wherein the parsing the interactive annotation protocol to obtain a parsing result and generating the at least one effect-editing control corresponding to the first effect based on the parsing result comprises:

parsing the interactive annotation protocol to obtain an editable item of the first effect and control associated information of the effect-editing control corresponding to the editable item; and generating the at least one effect-editing control corresponding to the first effect based on the editable item and the control associated information.

7. The effect processing method according to claim 1, wherein the displaying an edited applied result comprises:

determining a modified editable item in the first effect based on the editing operation, determining modified data corresponding to the modified editable item, and updating the modified data to the effect packet of the first effect; and executing an effect callback script with the updated data in the effect packet as an input parameter, generating the edited applied result, and displaying the applied result.

8. The effect processing method according to claim 1, further comprising:

displaying, in a case that an effect displaying resource is added with the second effect, in the effect displaying resource an effect link entry corresponding to the second effect; and receiving a link triggering operation with respect to the effect link entry, and displaying at least one of: the effect identifier of the second effect, and an effect identifier of the first effect corresponding to the second effect.

9. The effect processing method according to claim 1, further comprising:

receiving a filming triggering operation with respect to the second effect and displaying a filmed image;

displaying the second effect in the filmed image when it is detected that a preset effect displaying condition is met.

10. An electronic device, comprising:
at least one processor; and
a storage device configured to store at least one program;
wherein the at least one program, when executed by the at least one processor, causes the at least one processor to:

display, responsive to an effect-view triggering operation, an effect view interface, wherein the effect view interface includes at least one effect type tag;

receive a tag selecting operation with respect to the at least one effect type tag, and display an effect identifier of an alternative effect corresponding to a selected effect type tag;

take the alternative effect corresponding to the selected effect type tag as a first effect in a case that the selected effect type tag is a preset type tag;

receive an edit triggering operation with respect to the first effect, the edit triggering operation being inputted based on the effect identifier of the first effect;

display, responsive to receiving the edit triggering operation, at least one editing control corresponding to the first effect;

display, responsive to receiving an editing operation applied to the at least one editing control, the applied result corresponding to the edited effect; and generate, responsive to receiving a generation operation, a second effect corresponding to the applied result, and display an identifier of the second effect at a preset position.

11. The electronic device of claim 10, wherein the at least one processor is further caused to, after the displaying an effect identifier of the second effect at a preset position:

receive an effect selecting operation inputted based on the effect identifier of the second effect;

display, in a case of presence of an effect-applied object, an effect image after a selected second effect is applied to the effect-applied object.

12. The electronic device of claim 10, wherein the at least one processor is further caused to:

after the displaying an effect identifier of the second effect at a preset position, receive an effect sharing operation with respect to the second effect, and sharing the second effect to a target sharing object.

13. The electronic device of claim 10, wherein the at least one processor is further caused to, before the displaying at least one effect-editing control corresponding to the first effect:

acquire an effect packet of the first effect, wherein the effect packet includes an interactive annotation protocol; and parse the interactive annotation protocol to obtain a parsing result and generate the at least one effect-editing control corresponding to the first effect based on the parsing result.

14. The electronic device of claim 10, wherein the at least one processor is further caused to:

display, in a case that an effect displaying resource is added with the second effect, in the effect displaying resource an effect link entry corresponding to the second effect; and receive a link triggering operation with respect to the effect link entry, and display at least one of: the effect identifier of the second effect, and an effect identifier of the first effect corresponding to the second effect.

15. The electronic device of claim 10, wherein the at least one processor is further caused to:

receive a filming triggering operation with respect to the second effect and display a filmed image;

display the second effect in the filmed image when it is detected that a preset effect displaying condition is met.

16. A non-transitory storage medium having a computer-executable instruction stored thereon, wherein the computer-executable instruction, when executed by a computer processor, causes the computer processor to:

display, responsive to an effect-view triggering operation, an effect view interface, wherein the effect view interface includes at least one effect type tag;

receive a tag selecting operation with respect to the at least one effect type tag, and display an effect identifier of an alternative effect corresponding to a selected effect type tag;

take the alternative effect corresponding to the selected effect type tag as a first effect in a case that the selected effect type tag is a preset type tag;

receive an edit triggering operation with respect to the first effect, the edit triggering operation being inputted based on the effect identifier of the first effect;

display, responsive to receiving the edit triggering operation, at least one editing control corresponding to the first effect;

display, responsive to receiving an editing operation applied to the at least one editing control, the applied result corresponding to the edited effect; and generate, responsive to receiving a generation operation, a second effect corresponding to the applied result, and display an identifier of the second effect at a preset position.

17. The non-transitory storage medium of claim 16, wherein the computer processor is further caused to:

display, in a case that an effect displaying resource is added with the second effect, in the effect displaying resource an effect link entry corresponding to the second effect; and receive a link triggering operation with respect to the effect link entry, and display at least one of: the effect identifier of the second effect, and an effect identifier of the first effect corresponding to the second effect.

18. The non-transitory storage medium of claim 16, wherein the computer processor is further caused to:

receive a filming triggering operation with respect to the second effect and displaying a filmed image; and display the second effect in the filmed image when it is detected that a preset effect displaying condition is met.

* * * * *